June 26, 1956

W. H. SILVER 2,751,835

TOOL CARRIER

Filed Oct. 17, 1951

INVENTOR.
WALTER H. SILVER
BY
C. Parker + R. G. Johnson
ATTORNEYS

June 26, 1956   W. H. SILVER   2,751,835
TOOL CARRIER

Filed Oct. 17, 1951   3 Sheets-Sheet 2

*INVENTOR.*
WALTER H. SILVER
BY
ATTORNEYS

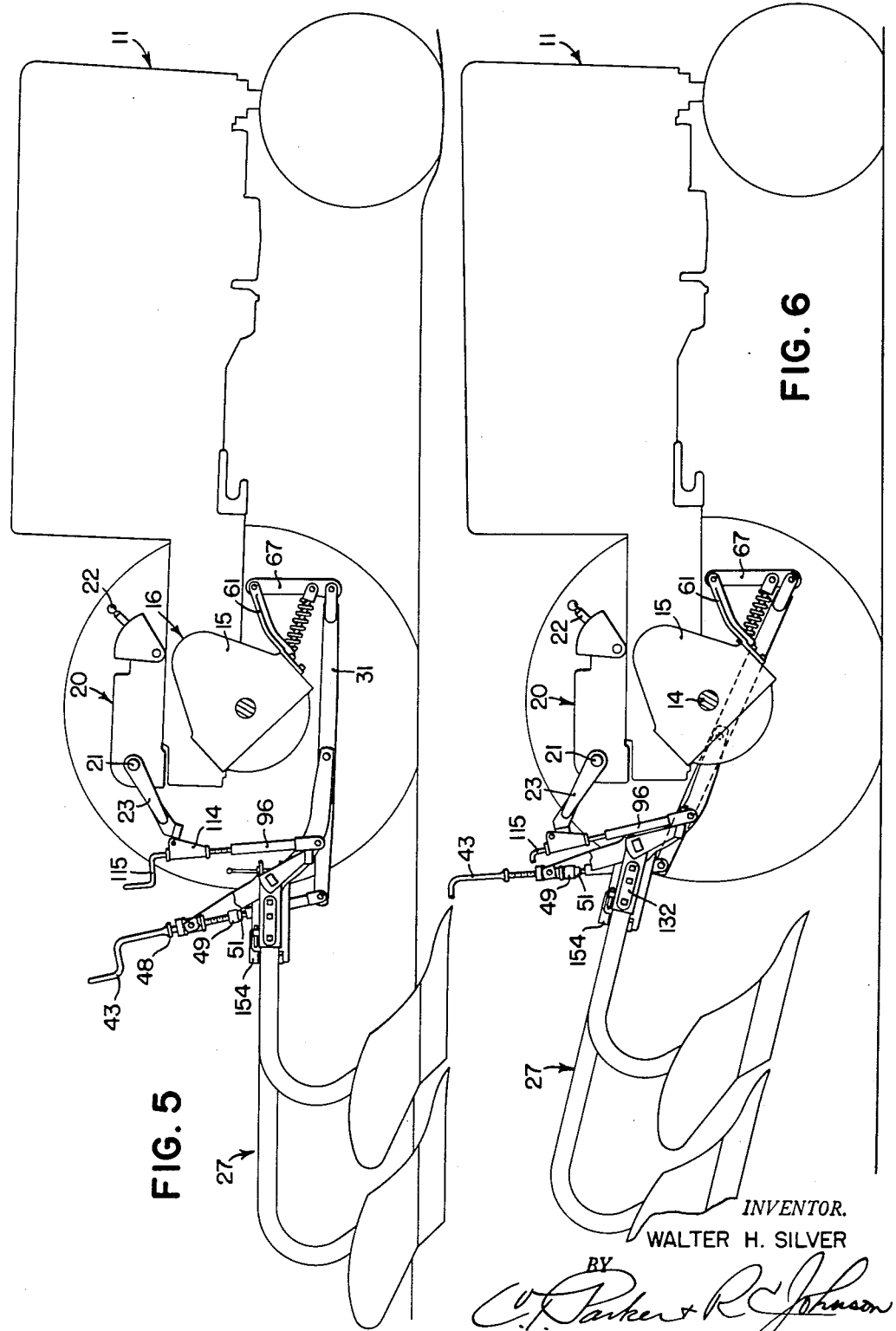

United States Patent Office 2,751,835
Patented June 26, 1956

2,751,835

TOOL CARRIER

Walter H. Silver, Moline, Ill., assignor to Deere & Company, Moline, Ill., a corporation of Illinois Application October 17, 1951, Serial No. 251,753

12 Claims. (Cl. 97—47.14)

The present invention relates generally to agricultural implements and more particularly to tractor-propelled, ground-engaging or ground-working implements adapted to be raised and lowered relative to the propelling tractor.

The object and general nature of the present invention is the provision of a tractor-propelled implement which includes a hitch frame unit connected with and controlled by the tractor and tool-means adapted to be rigidly connected with said hitch frame unit. More specifically, it is a feature of this invention to provide a new and improved draft frame or draft unit comprising relatively adjustable parts, to one of which the ground-engaging tool is adapted to be fixedly connected.

It is an additional feature of the present invention to provide a controlled lost-motion connection between the ground-engaging tool and certain portions of the draft frame, whereby a certain amount of up-and-down movement of the front end of the tractor is tolerated without materially affecting the operation of the ground-working tool.

These and other objects and advantages of the present invention will be apparent to those skilled in the art after a consideration of the following detailed description taken in conjunction with the accompanying drawings, in which:

Figure 4 is an enlarged sectional view, showing one of the adjustable connections between the implement frame and the implement carrier.

Figures 5 and 6 are views similar to Figure 1, showing different positions of the implement.

Figure 7 is a perspective view showing an auxiliary tool bar attachment section adapted to connect various tools to the carrier shown in Figures 1 and 2.

Figure 1:
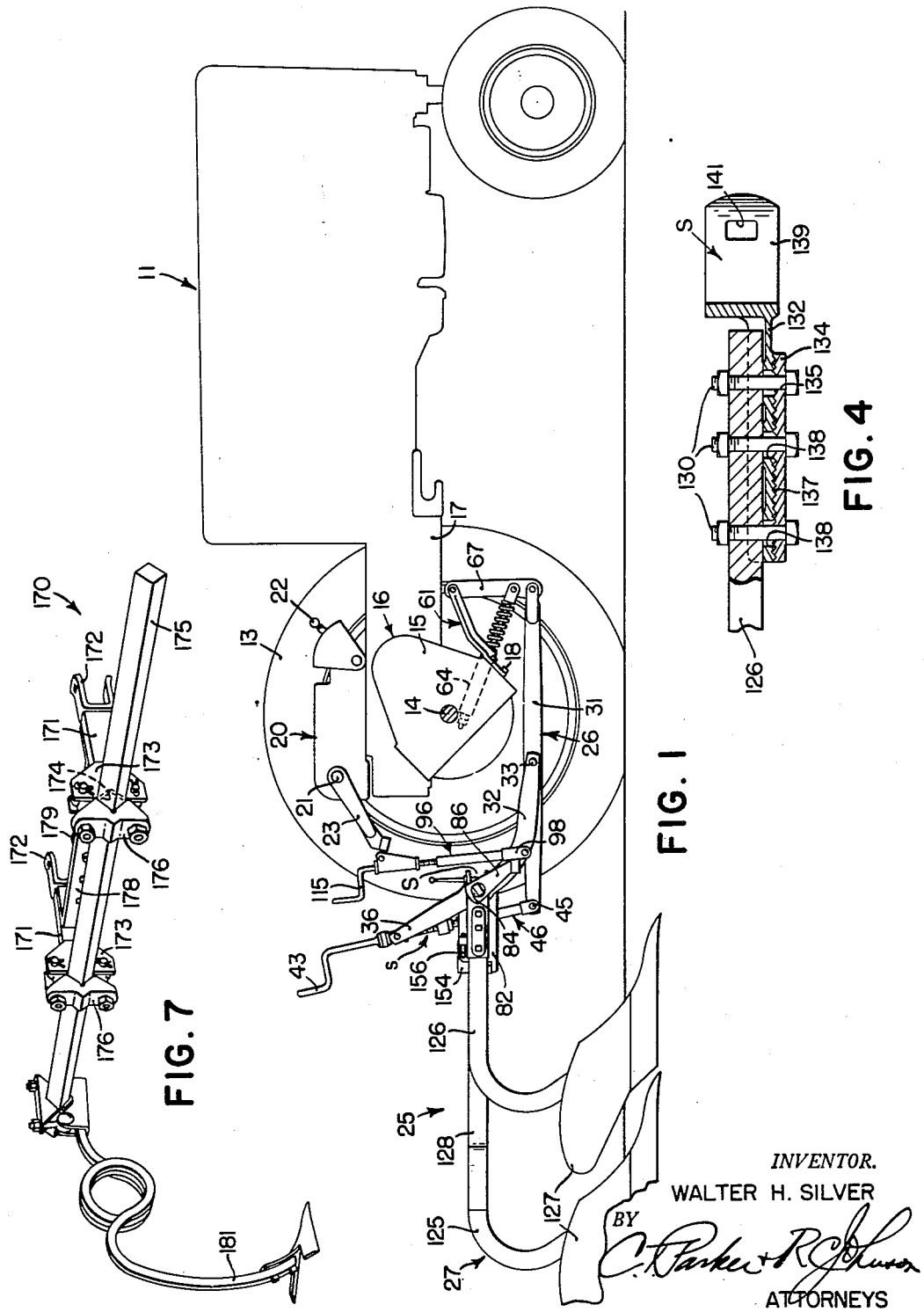
Figure 1 is a side view of a tractor-mounted tool carrier, with an implement connected therewith, incorporating the principles of the present invention.

Referring now to the drawings, more particularly to Figure 1, the tractor is indicated in its entirety by the reference numeral 11 and includes a pair of closely spaced front wheels and a pair of widely spaced rear traction wheels 13 mounted in axle shafts 14 that are carried in extensions 15 that form a part of a rear axle structure 16. The latter is secured to or forms a part of the frame 17 of the tractor, and the rear tractor axle 16 includes attaching studs 18 or the like that are adapted to receive various implement parts. The tractor 11 is provided with a power operated unit 20, which is of conventional construction so far as the present invention is concerned. The power operated unit 20 constitutes power lift apparatus and includes a power lift part in the form of a transverse rockshaft 21 disposed for movement about a transverse axis at the rear of the tractor, the rockshaft 21 being movable through approximately 60° by hydraulic means which derives operating energy from the motor of the tractor and which is controlled by a valve lever 22. A pair of operating arms 23 is connected to opposite ends of the power lift rockshaft 21.

As best shown in Figure 1, the agricultural implement of the present invention, which is indicated in its entirety by the reference numeral 25, comprises a draft frame 26 and tool means 27, the latter being, for purposes of illustration, in the form of a two-bottom moldboard plow. The draft frame unit 26 comprises a generally fore-and-aft disposed beam member 31 to the intermediate portion of which a generally V-shaped control member, indicated in its entirety by the reference numeral 32, is pivotally connected, as by a stud bolt 33. Preferably, the control member 32 is made up of a pair of generally V-shaped, substantially identical bars 35 and 36, one being apertured at its forward end to receive the shank portion of the stud bolt 33 and the other being apertured and tapped to receive the threaded end of the bolt 33, the latter passing through an aperture in the intermediate portion of the fore-and-aft extending beam member 31. The upper or rear ends of the bars 35 and 36 are apertured to receive the trunnions 38 of a swivel member 39, which preferably is in the form of a sleeve that extends generally vertically and receives the upper member 41 of a pair of telescoping parts, indicated at 41 and 42. The upper part 41 includes a crank section 43 and the lower part of the lower member 42 is bifurcated, as at 44, and apertured to receive the rear end of the fore-and-aft extending beam member 31 and a pivot member 45 that pivotally connects the rear end of the beam 31 with the adjustable connector 46, which is made up of the telescopically associated parts just described. The upper end of the lower part 42 is provided with a nut member 47 and the lower end of the upper member 41 is threaded so as to screw into the lower member 42. The upper member 41 carries a pair of abutments, the upper abutment 48 being fixed to the member 41 and the lower abutment 49 being in the form of a screw-threaded sleeve member that is disposable in different axial positions along the upper member 41 below the sleeve 39 and is held in different positions of adjustment by a lock nut 51. For a purpose which will be explained later in more detail, there is, according to the principles of the present invention, a space $s$ between the sleeve or swivel member 39 and the abutment or stop 49 whereby the control member 32 is permitted to have some pivoting movement at all times relative to the beam member 31 and in any position of adjustment of the two telescopically associated parts 41 and 42.

Figure 2:
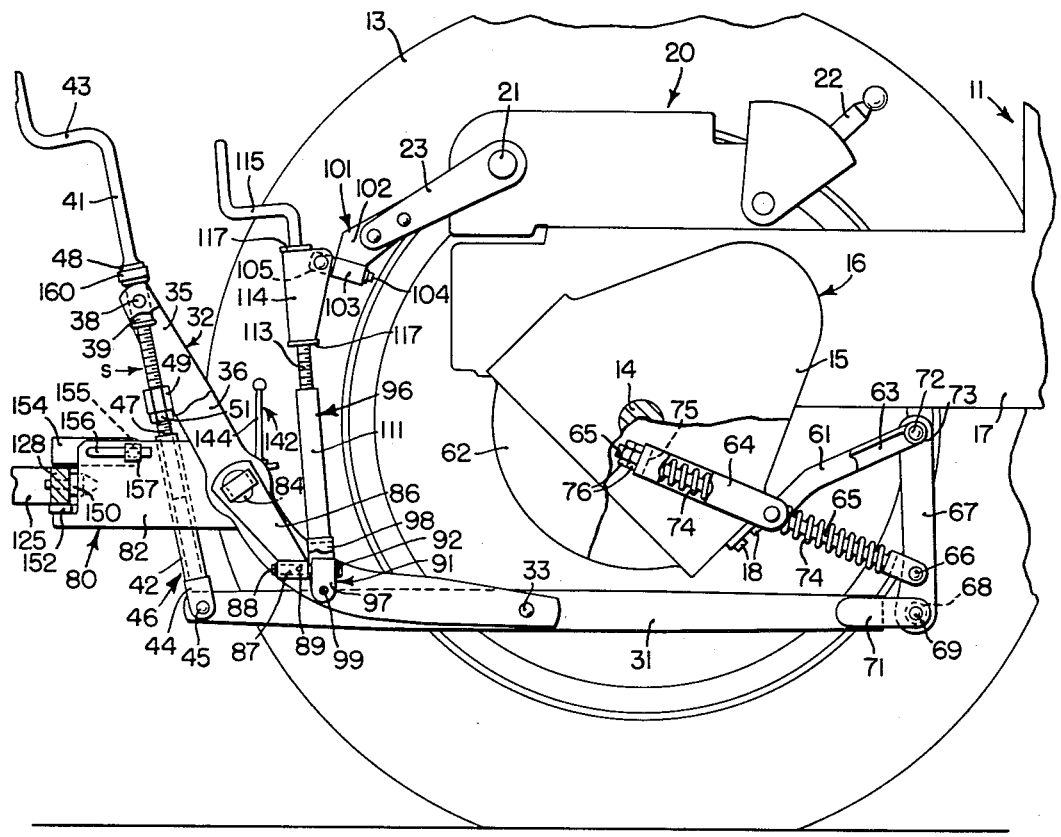
Figure 2 is an enlarged side view and Figure 3 a fragmentary plan view of the tool carrier shown in Figure 1.

The front end of the beam member 31 is adapted to be connected in draft-transmitting relation with respect to the tractor by hitch means which will now be described. A pair of hitch brackets 61 are bolted to forward portions of the associated drop housings 62 of the tractor rear axle means 16, and each bracket includes a forwardly extending portion 63 and a rear portion that receives a yoke 64 that is swingably mounted in suitable apertures formed in the bracket section 63. The yoke is generally U-shaped and is apertured to slidingly receive a rear portion of a plunger rod 65, the front end of which is pivotally connected, as at 66, to a swinging link member 67, the lower end of which carries a ball or universal joint member 68 receiving a pivot member 69 by which the front end of the beam 31 is connected to the lower end of the link 67, preferably by a pair of apertured straps 71 fixed, as by welding, to the sides of the front end of the plow beam 31. The upper end of the link 67 is fixed to a cross shaft 72 which, as will be clear from Figure 2, is rockingly received in apertured bosses 73 formed on the hitch brackets 61. A compression spring 74 is disposed between a shoulder on the front end of the plunger rod 65 and the rear or central portion 75 of the yoke 74. A pair of lock nuts 76 are carried on the rear threaded portion of the plunger rod 65 to limit the forward movement of the swinging hitch link 67 under the influence of the compression spring 74.

The control member 32, which is adjustable relative to the beam 31 about a transverse axis defined by the pivot member 33, carries tool-receiving means which is indicated in its entirety by the reference numeral 80. The tool-receiving means 80 comprises a pair of bracket plates 82, welded at their forward edges to the bars 35 and 36, adjacent the enlarged portions thereof that are apertured to receive a cross shaft 84 that is welded to the bars 35 and 36. The shaft 84 extends laterally outwardly beyond the bracket plates 82, the cross shaft 84 forming the principal part of the tool-receiving means 80. Secured to the outer ends of the cross shaft 84 is a pair of lift arms 86. Preferably, the arms 86 are secured, as by welding, rigidly to the shaft ends, and at their forward ends each of the arms 86 receives a tubular bushing or sleeve 87 in which a connecting pin 88 is disposed. The pin 88 is secured non-rotatably in the sleeve 87 by any suitable means, such as a cross pin 89, and the forward end of each pin 88 includes a bearing portion on which a swivel 91 is mounted for rocking movement about a generally fore-and-aft extending axis. A snap ring 92 or other suitable means serves as a head for holding the swivel 91 in position on the pin 88.

A pair of lifting links 95 and 96 are connected at their lower ends with the associated swivels 91, and to this end each of the swivels includes a lower transversely apertured portion 97, and each of the lifting links 95 and 96 includes a lower apertured bifurcated section 98. A pivot pin 99 serves to connect the lower end of each of the links 95 and 96 to the associated apertured swivel section 97. An extension member 101 is fixed to each of the power lift rockshaft arms 23 and each extension member 101 comprises a plate 102 apertured to receive bolt means connecting the plate to the associated power lift arm, and a sleeve or bushing 103 welded or otherwise fixed to the plate 102. A pin 104 is connected for rocking movement in each of the sleeves 103 and each pin includes an eye 105 to which the upper bifurcated end of the link 95 is pivotally connected.

The other lift link 96 is preferably in the form of an adjustable means especially adapted for leveling the tool means 27 laterally. The adjusting link means 96 comprises a lower tubular section 111 pivotally connected, as at 99, to the forward end of the associated pin 88, the upper portion of the member 111 being screw threaded to receive the lower threaded end of an adjusting screw member 113. The upper end of the member 113 is disposed for rotation in a tubular member or bushing 114 that is pivotally connected to the eye section 105 of the associated pin 104 that is carried by the associated power lift arm 23. The leveling screw member 113 is held against axial displacement relative to the bushing 114 by a pair of collars 117 secured, as by welding, to the leveling screw 113. By virtue in this arrangement, turning the crank portion 115 of the leveling screw 113 in one direction or the other serves to raise or lower that side of the tool-receiving means and the tool means connected therewith. If desired, the link 95 may be constructed like the links 96 so that leveling adjustment of the tool may be made at either side of the tractor.

Figure 3:
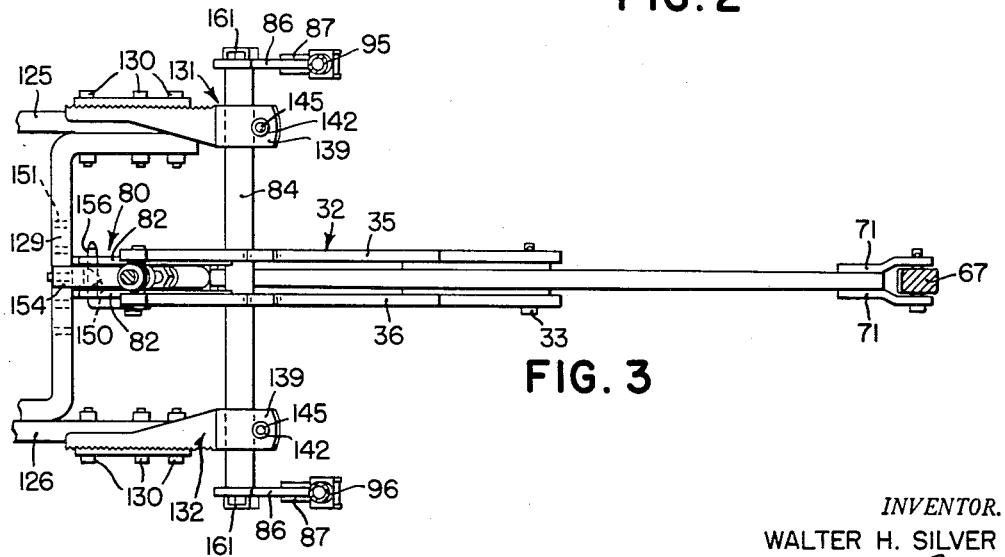

As mentioned above, the tool means 27 is in the form of a two-bottom moldboard plow which is to be considered as representative of any suitable ground-engaging means or any other suitable agricultural tool. The plow 27 comprises a pair of plow beams 125 and 126, each of which carries a plow-bottom-receiving standard at its rear end and to each of which a plow bottom 127 is connected. The plow beams 125 and 126 are interconnected by a rear brace 128 (Figure 1) and a front frame bar brace 129 (Figure 3). Preferably, the forward end portions of the beams 125 and 126 extend forwardly beyond the front brace 129 and are apertured to receive bolts 130 which secure a pair of socket members 131 and 132 to the front ends of the plow beams 125 and 126, respectively. Preferably, each plow beam carries a corrugated strap 134 having a plurality of ridges formed in one face and apertured, as at 135, to receive the associated bolts 130. The rear ends of the socket members 131 and 132 are similarly ridged or corrugated, as at 137, and the corrugated portion of each of the socket members is provided with a plurality of elongated slots 138 to receive the bolts 130, thus providing for securing the socket members to the plow beams in a number of different positions. Each of the socket members 131 and 132 is provided with a forwardly facing socket S formed by a U-shaped section 139 which forms a part of each socket member. The upper and lower portions of each of the U-shaped sections 139 are apertured, as at 141, to receive a hitch pin 142. Preferably, there are two pins 142, and each includes a lower section 143, preferably rectangular in section, and an upper handle section 144, with an abutment shoulder 145 therebetween. The pin-receiving openings 141 in the socket members are shaped to conform to the section of the pins 143. The yoke sections 139 fit snugly about the transverse bar 84.

Secured to the transverse plow frame brace 129, at different selected positions laterally along the brace, is an abutment bracket or guide pin 150 that is tapered at its forward end to facilitate its movement into position between the plates 82 of the tool-receiving member 80. The pin 150 may be placed in any one of a number of laterally spaced apart holes 151 in the frame brace 128. The plates 82 at their rear ends are formed to carry an upwardly facing abutment plate 152 that is adapted, when the implement is connected with the tractor, to underlie the plow frame brace 128, whereby when the carrier is raised the implement is lifted bodily relative to the tractor. A locking bar 154 is pivoted on a bolt 155 carried in apertures in the plates 82, and has its rear end adapted to overlie the plow frame bar 128, as best shown in Figure 1. For holding the implement against upward movement relative to the carrier, the bar 154 is locked to the plates 82 by a quick detachable pin 156 insertable through registering apertures in the plates 82 and the bar 154. A spring clip 157 on the end of the bolt 155 releasably holds the pin 156 in its bar-locking position. When the bar 154 is locked over the frame brace 128, holding the latter against the abutment plate 152, and the socket members are held engaged with the crossbar 82 by the pins 142, the implement is rigidly connected with the carrier. In normal operation, as illustrated in Figure 1, the collar 48 on the adjusting crank screw 43 bears against the upper end of the sleeve 39. However, as mentioned above, by virtue of the lost-motion space $s$ the entire control member 32 and the tool means attached rigidly thereto, can swing vertically through a limited distance relative to the beam 31. Thus, the rear wheels of the tractor may pass over humps or ridges momentarily without materially affecting the depth of operation of the plow 27. Similarly, the front end of the tractor may pass across ditches or depressions without tending to lift the tool out of the ground. During normal operation, as when plowing, the soil resistance causes the parts to take the positions shown in Figure 1, in which the sleeve 39 bears generally upwardly against the collar 48 on the adjusting screw 43, as through a thrust bearing part 160. Therefore, turning the adjusting screw 43 in one direction or the other, the crank screw 43 being readily accessible from the operator's position on the tractor, has the effect of adjusting the depth of operation through the raising or lowering of the front end of the beam 31 relative to the plow bottoms 127.

The implement 27 is readily disconnectible from the tractor, merely by lifting out the two hitch pin members 142 and then driving the tractor away from the implement. For convenience, apertured lugs 161 may be provided on the ends of the crossbar 84, or in other suitable locations, to receive the hitch pins 142 when the tool is disconnected from the tractor. After the pins 142 have been removed from the socket members 131 and 132 and the tractor driven forwardly away from the implement 27, the entire hitch structure, including the beam 31 and the tool-receiving means 32 remains on the tractor as an integral part thereof, and is ready to receive another implement or tool to be mounted on the tractor. Thus, as will be seen from the above description, the hitch and control structure becomes a part of the tractor and the tool means may be of very simple construction, requiring only one or two socket members 131 and a second abutment means 150, or their equivalents, whereby the tool means may readily be connected to the tractor by unlocking the bar 154, as by removing the pin 156, and then backing the tractor into position so as to cause the socket members 131 and 132 to engage the crossbar 84 and the abutment member 150 to move into position relative to the abutment means 152 and the bracket plates 82. Further, the latter serve also as means to hold the implement in position and prevent lateral displacement relative to the crossbar 84. However, the tool may be adjusted to different lateral positions merely by moving the abutment member 150 to different positions along the front transverse frame brace 128.

Tool means other than plows may be connected to the tool carrier 25 described above. For example, referring to Figure 7, tool means 170 of the universal type may be provided, such tool means comprising a pair of generally fore-and-aft extending frame bars 171 carrying socket members 172 at their forward ends and fixed at their rear ends to bracket plates 173 having V-shaped sockets 174 in which a transverse square tool bar 175 may be fixed, as by clamps 176. A crossbar 178 connects the two fore-and-aft extending bars 171 and the crossbar 178 adjustably carries an abutment member 179 which may be substantially the same as the abutment member 150 described above, the abutment member 179 being located relative to the associated socket members 172 in substantially the same relationship as the abutment member 150 occupies relative to the socket members 131 and 132. Any one or more of a number of different tools or operating units may be carried by the tool bar 175, such as, for example, coil spring cultivator teeth 181. It is believed to be unnecessary to mention or describe further the various other tools and operating units that may be mounted either on the tool bar 175 or, more generally, on the tool-receiving means 80. In each case, the position of the tool means is controlled by the crank screw 43 of the control unit 32, and where necessary, the tool means may be leveled by the leveling screw 113, either one or two of which may be provided, as described above.

Due to the fact that the lifting links 95 and 96 are connected with the tool-receiving means and with the power lift arms by what is equivalent to free swinging or universal joint means, the rear end of the beam 31 and the tool-receiving means carried adjustably thereby is free to swing laterally relative to the tractor. It may be that some tools would not operate properly if such lateral swinging were permitted, and any suitable motion-limiting means for limiting or preventing lateral swinging of the tool carrier may be provided, if desired.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A hitch device for connecting an implement to a propelling tractor, said device comprising a generally forwardly extending member adapted to be pivotally connected at its forward end in draft-transmitting relation with respect to the tractor, a rear implement-receiving control member pivotally connected to said first member for generally vertical hinging movement relative thereto about a transverse axis, adjusting means carried by one of said members and connected with the other member so as to act between said members to cause relative pivotal movement of one with respect to the other about said hinge axis, said control member carrying tool-receiving means including a pair of laterally spaced apart portions and rearwardly thereof a third implement-receiving portion, and means on the implement comprising a pair of laterally spaced apart members adapted to engage said laterally spaced apart portions and abutment means between and rearwardly of said spaced apart members to engage said third implement-receiving portion.

2. An agricultural implement adapted to be connected to a tractor of the type having a power lift unit, said implement comprising a generally vertically swingable member disposed generally centrally of the tractor and attachable at its forward portion to the tractor, a second generally centrally disposed member pivotally connected for vertical swinging movement with said first member, a transverse tool-receiving section carried by said second member and extending at its end portions laterally outwardly of said second member, a ground-engaging tool having forwardly facing laterally spaced apart socket means adapted to detachably engage said transverse section, generally centrally disposed means for detachably connecting said tool with said second member at a point spaced from said socket means, and lifting means connected with the laterally outer ends of said transverse tool-receiving section and extending generally upwardly for connection with the tractor power lift unit, said lifting means being adjustable for leveling the implement.

3. An agricultural implement adapted to be connected to a tractor of the type having a power lift unit, said implement comprising a two-part generally vertically swingable draft frame attachable at its forward portion to the tractor, said parts being relatively adjustable and one having a transverse tool-receiving section and a central generally rearwardly extending tool-receiving means, ground-engaging tool means, socket means carried thereby and adapted to receive said transverse section, means for locking said socket means on said section, forwardly extending means adapted to engage said central rearwardly extending tool-receiving means for connecting said tool means with said one draft frame part at a point spaced from said transverse section, whereby said tool means is vertically rigid relative to said one draft frame part, means for adjusting the position of one of said parts relative to the other part, and lifting means for connecting said one draft frame part with the tractor power lift unit.

4. An agricultural implement adapted to be connected with a tractor having a power lift, said implement comprising a tool carrier including a beam adapted to be connected at its forward end with the tractor, a generally vertical control member pivotally connected with said beam at a point forward of the rear end thereof for movement relative thereto about a transverse axis, and adjustable means connected with the rear end portion of said beam and the upper end of said control member for shifting one relative to the other about said transverse axis, a transverse bar fixed at its generally central portion to said control member, a portion on said control member extending generally rearwardly of said transverse bar, an agricultural tool, means for connecting said tool with the transverse bar and said generally rearwardly extending portion, whereby the tool is connected with said control member at two spaced apart points thereon, and lifting means connected with said control member and adapted to be connected with said tractor power lift.

5. An agricultural implement adapted to be connected with a tractor having a power lift, said implement comprising a tool carrier including a beam adapted to be connected at its forward end with the tractor, a control member pivotally connected with said beam for movement relative thereto about a transverse axis, and adjustable means connected with said beam and control member for shifting one relative to the other about said transverse axis, said control member having a transverse tool-receiving bar and a bracket having tool-receiving means spaced from said bar, an agricultural tool having at its forward end socket means to receive said bar and, rearwardly thereof, reaction means adapted to engage the tool-receiving means on said bracket.

6. A draft device for connecting an agricultural tool to a tractor, comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, bracket means on said control member, tool-receiving means on said control member, comprising a transverse bar fixed by said bracket means to said control member, and means connected with the outer end portions of said transverse bar for raising and lowering the tool connected thereto.

7. A draft device for connecting an agricultural tool to a tractor of the type having a power lift, said draft device comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, a transversely extending tool-receiving member fixed at an intermediate point to said control member, and lifting means for connecting the outer end portions of said tool-receiving member with the tractor power lift.

8. A draft device for connecting an agricultural tool to a tractor of the type having a power lift, said draft device comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, a transversely extending tool-receiving member fixed at an intermediate point to said control member, generally forwardly extending arms fixed at their rear portions to the laterally outer ends, respectively, of said transversely extending, tool-receiving member, and lifting means connected with the forward ends of said arms and adapted to be connected at their upper ends to the tractor power lift.

9. A draft device for connecting an agricultural tool to a tractor, comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, said connector comprising a pair of telescopically adjustable parts, shiftable axially one relative to the other and one connected with the rear portion of said beam, means establishing a limited lost-motion connection between the other of said last mentioned parts and the rear end portion of said control member, and tool-receiving means on said control member.

10. A draft device for connecting an agricultural tool to a tractor, comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, said connector comprising a pair of telescopically adjustable parts, shiftable axially one relative to the other and one connected with the rear portion of said beam, means connecting the other of said last mentioned parts with the rear portion of said control member, comprising a pair of stops fixed to said other part in axially spaced apart relation and a sleeve slidable on said other part between said stops and swiveled in the rear end of said control member, and tool-receiving means on said control member.

11. A draft device for connecting an agricultural tool to a tractor, comprising a generally fore-and-aft extending beam adapted to be connected at its forward portion in draft-transmitting relation with the tractor, a control member pivoted at its forward end to said beam forward of the rear end of the latter and extending generally upwardly and rearwardly therefrom, an adjustable connector attached between the rear end of said beam and the upper end of said control member, a pair of bracket plates fixed to opposite sides of said control member, said adjustable connector extending between said plates, tool-receiving means extending between the rear portions of said bracket plates, and laterally outwardly extending tool-receiving means carried by said bracket plates.

12. A draft device for connecting an agricultural tool to a tractor, comprising a generally fore-and-aft extending beam adapted to be connected at its forward portion in draft-transmitting relation with the tractor, a control member pivoted to said beam and extending generally upwardly and rearwardly therefrom, an adjustable connector attached between the rear end of said beam and said control member, said connector comprising a pair of telescopically adjustable parts, shiftable axially one relative to the other and one connected with said beam, means connecting the other of said last mentioned parts with said control member, comprising a pair of stops fixed to said other part in axially spaced apart relation and a sleeve slidable on said other part between said stops and swiveled in the rear end of said control member, and tool-receiving means on said control member.

References Cited in the file of this patent

UNITED STATES PATENTS

| 1,243,019 | Waterman | Oct. 16, 1917 |
| 1,538,757 | Swindall | May 19, 1925 |
| 1,939,950 | Brown | Dec. 19, 1933 |
| 2,483,565 | Strandlund | Oct. 4, 1949 |
| 2,583,897 | Smeds | Jan. 29, 1952 |
| 2,602,389 | Markel | July 8, 1952 |

FOREIGN PATENTS

| 609,341 | Great Britain | Sept. 29, 1948 |